(12) United States Patent
Shimul et al.

(10) Patent No.: US 12,435,903 B2
(45) Date of Patent: Oct. 7, 2025

(54) ELECTROACTIVE POLYMER VALVE

(71) Applicant: Texas Tech University System, Lubbock, TX (US)

(72) Inventors: Shakil Ahmad Shimul, Lubbock, TX (US); Wei Li, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 521 days.

(21) Appl. No.: 17/797,037

(22) PCT Filed: Feb. 23, 2021

(86) PCT No.: PCT/US2021/019291
§ 371 (c)(1),
(2) Date: Aug. 2, 2022

(87) PCT Pub. No.: WO2021/173589
PCT Pub. Date: Sep. 2, 2021

(65) Prior Publication Data
US 2023/0064742 A1 Mar. 2, 2023

Related U.S. Application Data

(60) Provisional application No. 62/980,890, filed on Feb. 24, 2020.

(51) Int. Cl.
*F24F 13/10* (2006.01)
*F16K 15/14* (2006.01)
*F16K 31/02* (2006.01)

(52) U.S. Cl.
CPC ............ *F24F 13/105* (2013.01); *F16K 15/14* (2013.01); *F16K 15/1401* (2021.08); *F16K 31/02* (2013.01); *F24F 2221/20* (2013.01)

(58) Field of Classification Search
CPC ..... F24F 13/105; F24F 2221/20; F16K 31/02; F16K 15/14; F16K 15/1401; F16K 15/144
(Continued)

(56) References Cited

U.S. PATENT DOCUMENTS 5,971,355 A * 10/1999 Biegelsen ................. F15C 5/00
251/129.01
7,063,268 B2 * 6/2006 Chrysler ................. F04B 19/24
310/365

(Continued)

FOREIGN PATENT DOCUMENTS

DE 102018218637 B3 2/2020
GB 2555480 A 5/2018

OTHER PUBLICATIONS

PCT/US2021/019291. International Search Report & Written Opinion (Sep. 27, 2021).
(Continued)

*Primary Examiner* — Hung Q Nguyen
(74) *Attorney, Agent, or Firm* — LOZA & LOZA, LLP; Kevin L. Soules

(57) ABSTRACT

A fluidic valve system comprises a housing, a shell mounted to the housing, a vent for allowing fluid to enter the housing in a high pressure zone, at least one Dielectric Elastomer Actuator (DEA) flap forming a seal with the shell, wherein applying a voltage to the DEA flap causes the DEA flap to open the seal with the shell so that fluid can exit through a low pressure zone created between the shell and the DEA flap, and a power supply for supplying the voltage to the DEA flap.

20 Claims, 13 Drawing Sheets

(58) Field of Classification Search
USPC .......................................................... 454/212
See application file for complete search history.

(56) References Cited

U.S. PATENT DOCUMENTS

| | | | | |
|---|---|---|---|---|
| 8,183,739 | B2* | 5/2012 | Heim | G02B 13/009 |
| | | | | 310/322 |
| 8,891,222 | B2* | 11/2014 | Benslimane | H04R 19/00 |
| | | | | 361/278 |
| 9,231,186 | B2* | 1/2016 | Büsgen | G06F 3/016 |
| 10,001,789 | B2 | 6/2018 | Hunka | |
| 2003/0141473 | A1* | 7/2003 | Pelrine | F16K 99/0015 |
| | | | | 251/129.06 |
| 2003/0214199 | A1* | 11/2003 | Heim | H04R 5/02 |
| | | | | 310/309 |
| 2004/0008853 | A1* | 1/2004 | Pelrine | F16F 15/005 |
| | | | | 381/191 |
| 2007/0200457 | A1* | 8/2007 | Heim | H10N 30/206 |
| | | | | 310/311 |
| 2009/0250021 | A1 | 10/2009 | Zarrabi et al. | |
| 2010/0099346 | A1* | 4/2010 | Browne | F16K 17/0413 |
| | | | | 454/70 |
| 2017/0045153 | A1 | 2/2017 | Scheibe | |
| 2017/0333645 | A1 | 11/2017 | Alizoti et al. | |
| 2020/0032822 | A1 | 1/2020 | Keplinger et al. | |

OTHER PUBLICATIONS

Mu et al. "A dual-stage low-power converter driving for piezoelectric actuator applied in micro robot." International Journal of Advanced Robotic Systems, vol. 16 issue 1 (Feb. 4, 2019).

* cited by examiner

ELECTROACTIVE POLYMER VALVE

CROSS REFERENCE TO RELATED APPLICATIONS

This application claims the priority and benefit under 35 U.S.C. § 119(e) of U.S. Provisional Patent Application Ser. No. 62/980,890 filed Feb. 24, 2020, entitled "ELECTROACTIVE POLYMER VALVE." U.S. Provisional Patent Application Ser. No. 62/980,890 is herein incorporated by reference in its entirety.

TECHNICAL FIELD

Embodiments are generally related to the field of electroactive polymers. Embodiments are further related to the field of electroactive polymer applications. Embodiments are also related to the field of window design. Embodiments are further related to the field of electroactive polymers configured to provide active and passive environmental control systems. Embodiments are also related to electroactive polymer fluid ducts, valves, and pumps. Embodiments are also related to smart window systems using environmentally responsive electroactive polymers.

BACKGROUND

Architects and engineers alike have long strived to develop dwellings that provide low cost environment control. For optimal human comfort, balancing indoor-outdoor relationships between temperature, humidity, light intensity and carbon dioxide concentration is highly desirable. Most residences and offices use one of a selection of well-known air-conditioning systems to maintain indoor air quality, despite the fact that many of these systems consume a large amount of energy. Indeed, in some cases almost 30% of the total building energy is devoted to HVAC systems.

On top of this, in many environments the outdoor temperature is not always extreme and could be comfortably interchanged with the indoor environment. For example, during the summer in a semi-arid place like Lubbock, TX, the outdoor air temperature is usually comfortable for most of the day and the average diurnal temperature change is 23-degree Fahrenheit. Almost all year, at some point during every day, there are several hours when it would be reasonable to control the indoor environment by letting the outdoor air in, while shutting down HVAC systems.

Currently there are no windows designed to maintain indoor air quality through both active and passive ventilation systems. Most smart windows are designed to change color in the presence of solar radiation. Other smart windows use mechanical actuators like motors or pistons. One of the major disadvantages of these systems is that they require a fixed frame to guide the mechanical force which provides linear movement only. Therefore, the entire system becomes more rigid, heavy, and does not allow structural adaptability to the surface where it is being applied. In addition, motors and/or pistons are expensive, complicated, require maintenance, and generally cannot generate organic movement.

It is therefore desirable to have systems and methods capable of actively and/or passively pumping air from the outdoors into an indoor environment, at low energy cost, while maintaining an aesthetically pleasing form, as accomplished by the methods and systems disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a fluidic valve.

It is an aspect of the disclosed embodiments to provide methods and systems for pumping fluid from one area to another.

It is an aspect of the disclosed embodiments to provide methods and systems for smart valves that can be active or passive.

It is an aspect of the disclosed embodiments to provide methods and systems for control systems.

It is an aspect of the disclosed embodiments to provide methods and systems for smart windows using Dielectric Elastomer Actuator (DEA) flaps.

It is an aspect of the disclosed embodiments to provide smart window systems using environmentally responsive electroactive polymers.

For example, in an embodiment a system comprises a housing, at least one shell mounted to the housing, and at least one Dielectric Elastomer Actuator (DEA) flap forming a seal with the at least one shell, wherein applying a voltage to the DEA flap causes the DEA flap to open the seal with the at least one shell. The system can further comprise a power supply for supplying the voltage to the DEA flap. The power supply can comprise at least one of a solar panel and/or a battery. The system can further comprise a vent and a manifold formed in the at least one shell in fluidic connection with the vent, wherein fluid can flow into the manifold through the vent.

In an embodiment the system further comprises a control system comprising at least one sensor and a microcontroller, wherein the control system is configured to control the voltage provided to the DEA flap. The at least one sensor further comprises at least one of: a temperature sensor, a humidity sensor, a light sensor, and/or a carbon dioxide sensor.

In an embodiment, the at least one shell comprises an array of shells and the at least one DEA flap comprises an array of DEA flaps. In an embodiment the housing is configured to be mounted as a window.

In another embodiment a smart window system comprises a housing configured to fit in an opening for a window, at least one shell mounted to the housing, a vent, a manifold formed in the shell in fluidic connection with the vent, wherein fluid can flow into the manifold through the vent, at least one Dielectric Elastomer Actuator (DEA) flap forming a seal with the shell, at least one power supply supplying voltage to the DEA flap, and a control system comprising at least one sensor and a microcontroller, wherein the control system is configured to control the voltage provided to the DEA flap, wherein turning the power supply on causes the DEA flap to open the seal with the shell and turning the power supply off causes the DEA flap to close and seal with the shell. The power supply can comprise at least one of a solar panel and a battery. The at least one sensor further comprises at least one of: a temperature sensor, a humidity sensor, a light sensor, and/or a carbon dioxide sensor. The at least one shell can comprise an array of shells and the at least one DEA flap comprises an array of DEA flaps. The system can further comprise at least one of a weather coating formed on the DEA flap and/or a thermal coating formed on the DEA flap.

In another embodiment a fluidic valve system comprises a housing, a shell mounted to the housing, a vent for allowing fluid to enter the housing in a high pressure zone, and at least one Dielectric Elastomer Actuator (DEA) flap forming a seal with the shell, wherein applying a voltage to the DEA flap causes the DEA flap to open the seal with the shell so that fluid can exit through a low pressure zone created between the shell and the DEA flap. The fluidic valve system further comprises a power supply for supplying the voltage to the DEA flap. The power supply comprises at least one of a solar panel and/or a battery.

The fluidic valve system can further comprise a control system comprising a microcontroller, wherein the control system is configured to control the voltage provided to the DEA flap.

In an embodiment the DEA flap of the fluidic valve system comprises a polymer film, a first conductive carbon coating applied to the top of the polymer film, a second conductive carbon coating applied to the bottom of the polymer film, and a frame. In an embodiment the fluidic valve system comprises at least one of a weather coating formed on the DEA flap and/or a thermal coating formed on the DEA flap. The fluidic valve system further comprises a manifold formed in the shell in fluidic connection with the vent, wherein fluid can flow into the manifold through the vent.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
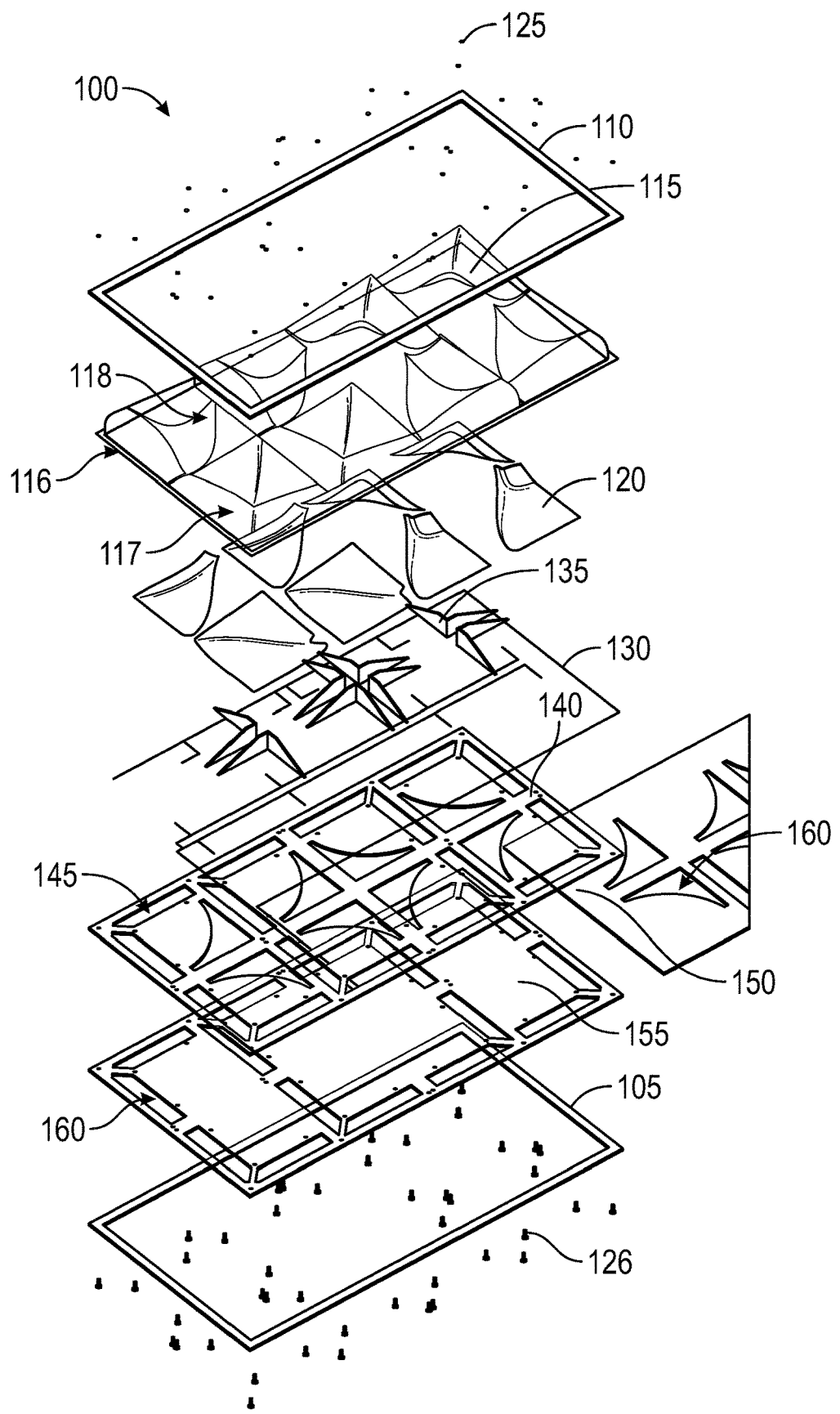
FIG. 1 depicts separated view of a smart valve in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments disclosed herein are generally directed to an Electroactive Polymer (EAP) based valve. In certain embodiments, the disclosed EAP valves can be used for various purposes, including but not limited to, EAP-based, solar-powered, environmentally responsive smart windows. However, in other embodiments, the smart valves disclosed herein can more generally be used for pumping fluid from one environment to another.

FIG. 1 illustrates components of an EAP-based pumping valve in accordance with the disclosed embodiments. The system 100 can comprise a bottom frame 105 and a top frame 110. The bottom frame 105 and top frame 110 are configure to bind the remaining layers of the EAP-based pumping valve system 100. The bottom frame 105 and top frame 110 can generally comprise metal frames with aligned holes configured along the frames to allow blots or screws to hold the system 100 together.

It should be noted that the EAP-based pumping valve system 100 illustrated in FIG. 1, includes a set of 8 valves integrated into a single unit. In other embodiments, the number of valves can be adjusted from a single valve up to as many as are desired. The 8 valve embodiment illustrated in FIG. 1 is meant to be exemplary.

The system 100 can include a shell 115 configured to match the shape of DEA flaps 120, as further detailed herein. The shell 115 can generally comprise a plastic shell, but other materials that can hold the necessary shape might also be used in other embodiments. The shell material can be selected to be transparent, semi-transparent, or translucent in certain embodiments, to allow light to pass through the shell. The shape of the shell 115 is critically important. The shell 115 can include an outer rim 116 that can be affixed to the top frame 110 with bolts 125 and bottom screws 126.

The shell 115 further includes a raised outer channel creating a manifold 117. The manifold 117 can be connected to one or more flap molds 118. The flap molds 118 can be diamond shaped molds which can be connected to the raised outer channel manifold 117. Specifically, the back corner of the flap molds 118 can be connected at their low corner to the manifold 117. The edges extending from the low corner of the flap molds 118 can also be connected to the manifold 117. The high corner of the flap mold is raised with a crease running from the high corner to the low corner. This creates a stiff upward sloping form for the flap molds that is meant to mirror the shape of the DEA flaps 120. Again, it should be noted that the system 100 includes 8 integrated valves but in other embodiments, other configurations can be used.

The next layer of the system 100 can include one or more Dielectric Elastomer Actuator (DEA) flaps 120. The DEA flaps are formed from electroactive polymers. DEA is a compliant capacitor, formed by connecting electrodes on both sides of an elastomer film. Dielectric polymer acts like a capacitor and requires very low energy to run. When a voltage is applied between the electrodes, the associated electrostatic pressure applies a force to the elastomer film creating an electromechanical pressure. In other words, the application of a voltage creates a controllable physical movement of the DEA flaps.

Figure 2A:
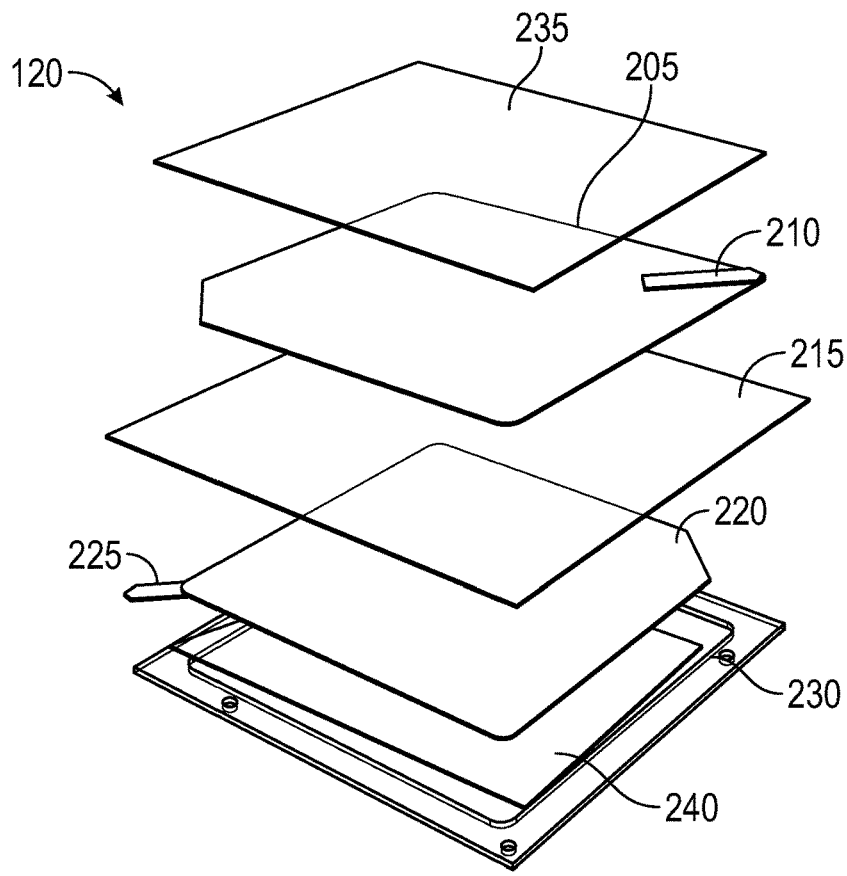
FIG. 2A depicts a separated view of a DEA flap associated with the disclosed embodiments.

FIG. 2A illustrates the configuration of a DEA 120 in accordance with the embodiments disclosed herein. In certain embodiments the top layer 235 can comprise a weather coating and/or insulation coating. The top layer 235 can protect the underlying layers from damage from exposure to environmental elements such as sun light, wind, rain, snow etc. The top layer 235 can further or alternatively comprise an insulative coating that reduces thermal energy transfer through the DEA 120. A similar bottom layer 240 can comprise a similar weather coating and/or insulation coating. In certain embodiments, the top layer 235 and bottom layer 240 may be selected to have one or both of a weather coating and insulation coating according to their respective arrangement. For example, the inner facing side being either the top layer 235 or bottom layer 240 may not be exposed to damaging weather elements. Thus, the inward facing side can be coated with a thermal coating only. The outward facing side being either the top layer 235 or bottom layer 240 can be coated with both the thermal and weather coating since the outward facing side will have greater environmental exposure. Other combinations of the coatings might also be selected according to design considerations.

The next layer can comprise a conductive carbon coating 205, with a power connector 210 connected thereto. The carbon coating 205 covers a pre-stretched film layer 215. The stretchable film layer 215 of the DEA 120 can comprise 3M® 4910 clear acrylic tapes, or other similar tape. In other embodiments, the stretchable film layer 215 of the DEA 120 can comprise other such stretchable elastic polymers. The film layer 215 can be stretched to approximately 4 times to its initial area with a custom-made stretching mechanism and then attached to bottom layer of conductive carbon coating 220 with a power connector 225. The conductive carbon layers 210 and 220 can comprise a carbon powder (applied as both the top and bottom layer) with connecting wires inlaid. A clear polyester frame 230 can be attached.

Figure 2B:
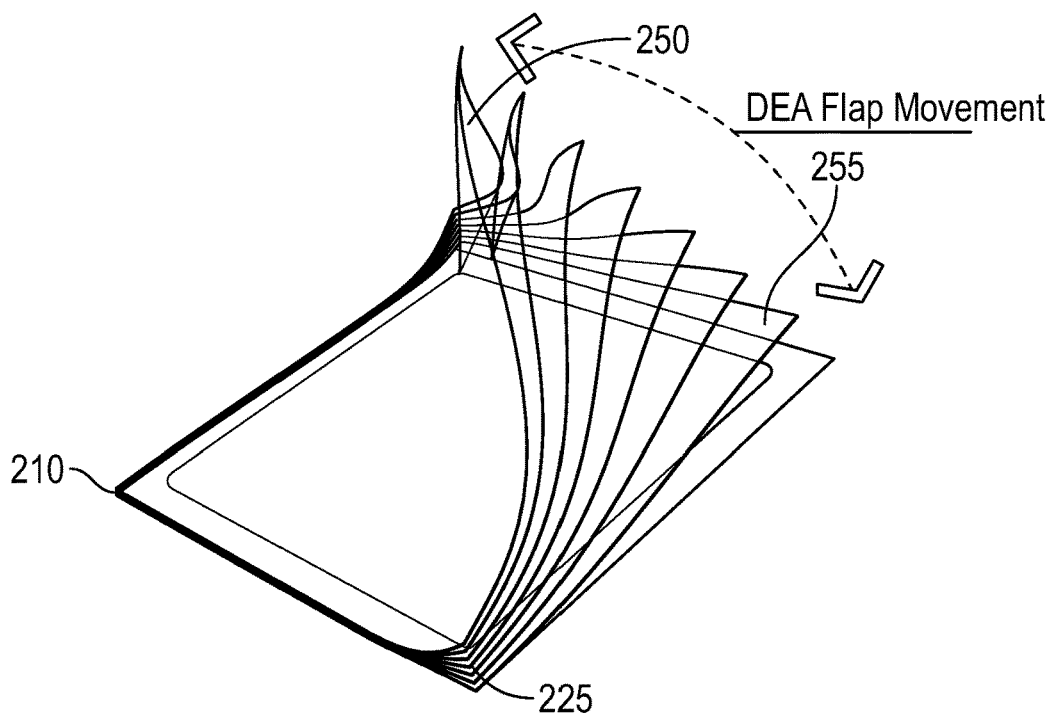
FIG. 2B depicts a DEA flap, in accordance with the disclosed embodiments.

As illustrated in FIG. 2B, in an inactive mode the DEA flap is in a raised position 250. When a voltage is applied, i.e. active mode, via the top and bottom power connectors, the DEA flap moves from the raised position to a flat position 255.

In the embodiments, disclosed herein, the DEA flaps 120 are shaped to match the shape of the flap molds 118 of shell 115. Each DEA flap 120 can be configured below an associated flap mold 118 as illustrated in FIG. 1. The DEA flaps 120 can be fixed or bound along their two outer edges and connected to electric leads 130 (which can be embodied as power connecter 210 and power connector 225) that allow the necessary voltage to be applied to the flaps 120 to generate motion. The DEA flaps 120 are configured to move from a flat, or mostly flat position to a raised position where the inside corner of the DEA flap raises to connect with the flap mold 118.

In certain embodiments, a landing frame 135 can be fitted below the DEA flaps 120. The landing frame 135 can comprise a tapered riser with a 90 degree bend. The high point of the landing frame 135 can be arranged at the crux of the 90 degree bend, and the height of the landing frame can then taper toward its ends, which can meet the fixed edges of the DEA flaps 120.

The next layer can comprise a base frame 140. The base frame 140 comprises a rigid or semi-rigid structure with cutouts 145 shaped to align with the manifold 117 underneath the shell 115 and under the moving ends of the DEA flaps 120. The base frame 140 allows fluid (e.g. air) to pass through the cutouts 145 and serves as a structural support for the system 100. The base frame 140 can be formed of plastic, or hardened polymers. In certain embodiments, the base frame 140 can be clear transparent, or semi-transparent to allow light to pass through the system 100.

In certain embodiments an active main screen 150 or an inactive main screen 155 can be inserted between the base frame 140 and bottom frame. The active main screen 150 and inactive main screen 155 can be substitutes for one another via an opening created between the bottom frame 105 and base frame 140. Both the active main screen 150 and inactive main screen 155 include air vents 160. The active main screen 150 can be used in an active pumping mode and the inactive main screen 155 can be used in an inactive pumping mode. The bottom frame 105 can be bound to the top frame 110 with screws 126 and bolts 125 to hold the system 100 together.

FIG. 3A-3D illustrates the working principle of the valve system 100 disclosed herein. In general, movement of the DEA flaps 120 can take advantage of high- and low-pressure zones, to pump fluid from one side of the system 100 to the other. However, in other embodiments the system 100 can be held in an open or closed state to allow or prevent fluid flow from one side of the system 100 to the other.

Figure 3A:
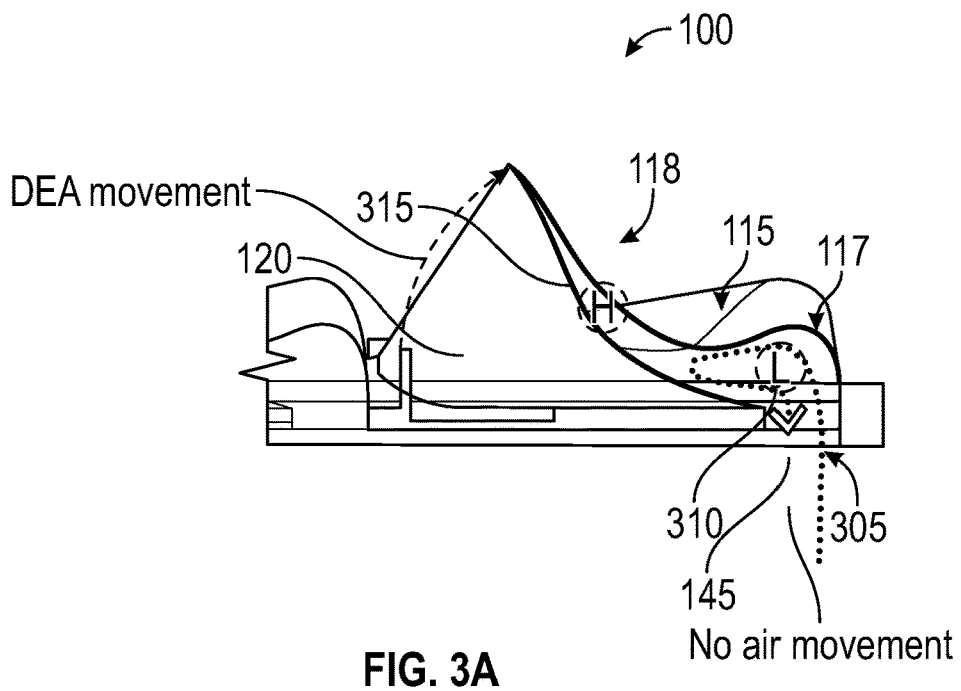
FIG. 3A depicts a smart valve in a closed position, in accordance with the disclosed embodiments.

In FIG. 3A the system 100 is illustrated in a closed position. In the closed position, voltage is tuned off so the DEA flap 120 is resting in its inactive raised position and forms a seal with the flap mold 118 of shell 115. An air vent 305 is formed by the alignment of the manifold 117 over the cutouts 145. The air vent 305 allows air (or other fluid) to enter and exit the manifold 117. In this state the fluid 310 entering through the air vent 305 is at low pressure due to expansion. A high pressure region 315 forms between the DEA flap 120 and flap mold 118. However, there is no air movement because the DEA flap 120 is sealed to the flap mold 118.

Figure 3B:
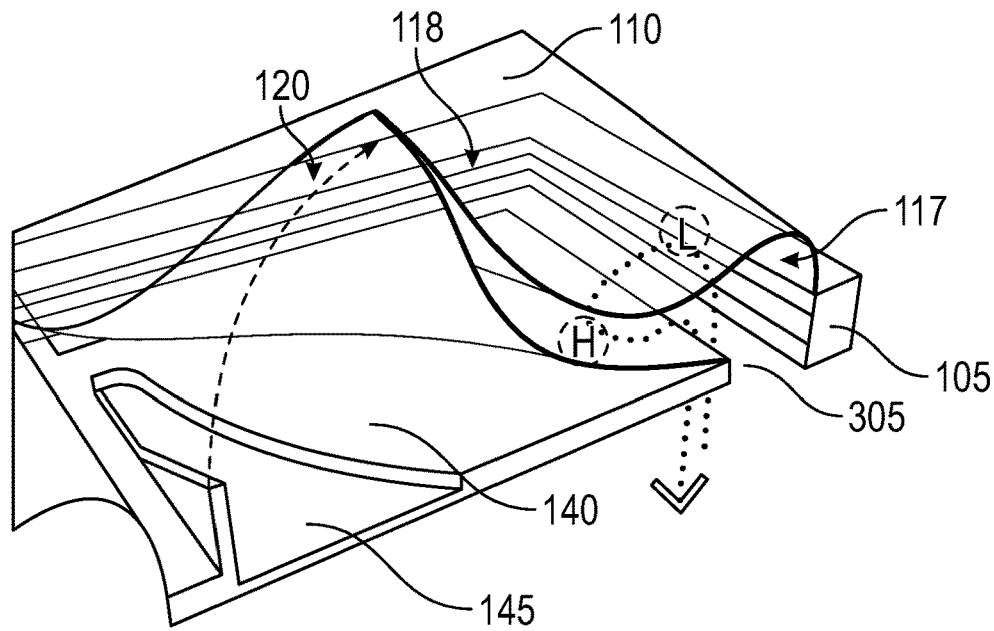
FIG. 3B depicts another view of a smart valve in a closed position, in accordance with the disclosed embodiments.

This is further illustrated in the cutout out view of the system 100 in FIG. 3B, which show the base frame 140 with a main active screen 150 (a main inactive screen 155 could also be inserted according to user selection) bound between the top frame 110 and bottom frame 105. The air vent 305 allows air to enter the manifold 117, and the space between the shell 115 and the DEA flap 120. However, the DEA flap 120 and flap mold 118 are sealed so the air cannot pass through the system 100.

Figure 3C:
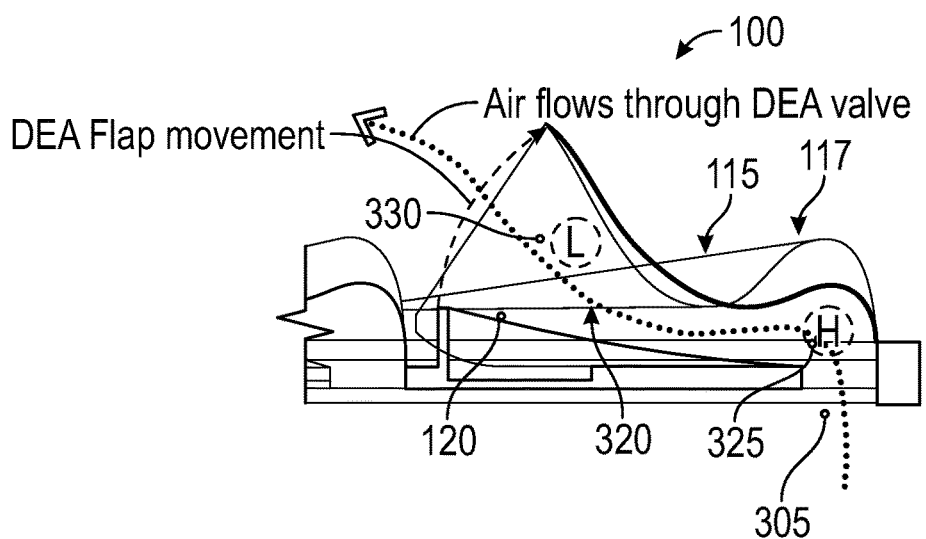
FIG. 3C depicts a smart valve in an open position, in accordance with the disclosed embodiments.

FIG. 3C illustrates the system 100 in an open condition. In this illustration, the DEA flap 120 has been moved into a flat or lower position, opening a fluid channel 320 through the system 100. When the DEA flap 120 is moved down the relative high pressure zone 325 in the manifold 117 causes air entering through the air vent 305 to move toward the low pressure zone 330 created by the expansion of the DEA flap 120 (into its open position).

Figure 3D:
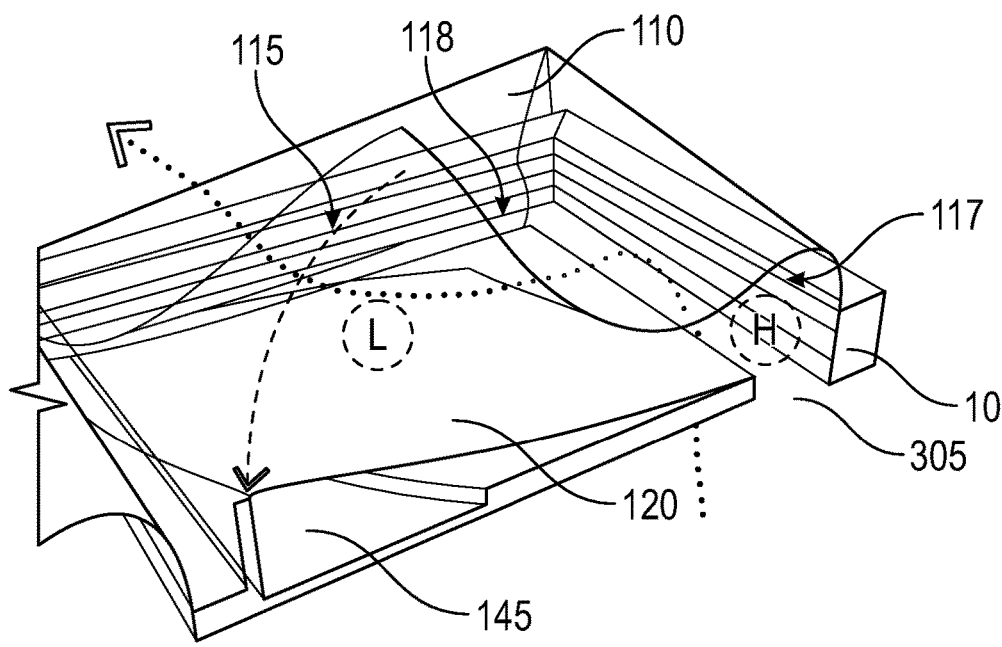
FIG. 3D depicts another view of a smart valve in an open position, in accordance with the disclosed embodiments.

This is further illustrated in the cutout view of the system 100 in FIG. 3D. FIG. 3D shows the base frame 140 with an main active screen 150 (a main inactive screen 155 could also be inserted according to user selection) bound between the top frame 110 and bottom frame 105. The air vent 305 allows air to enter the manifold 117, and the space between the shell 115 and the DEA flap 120. In this case, the DEA flap 120 is lowered creating fluid channel 320 between the DEA flap 120 and flap mold 118 so the air can pass through the system 100.

Figure 4:
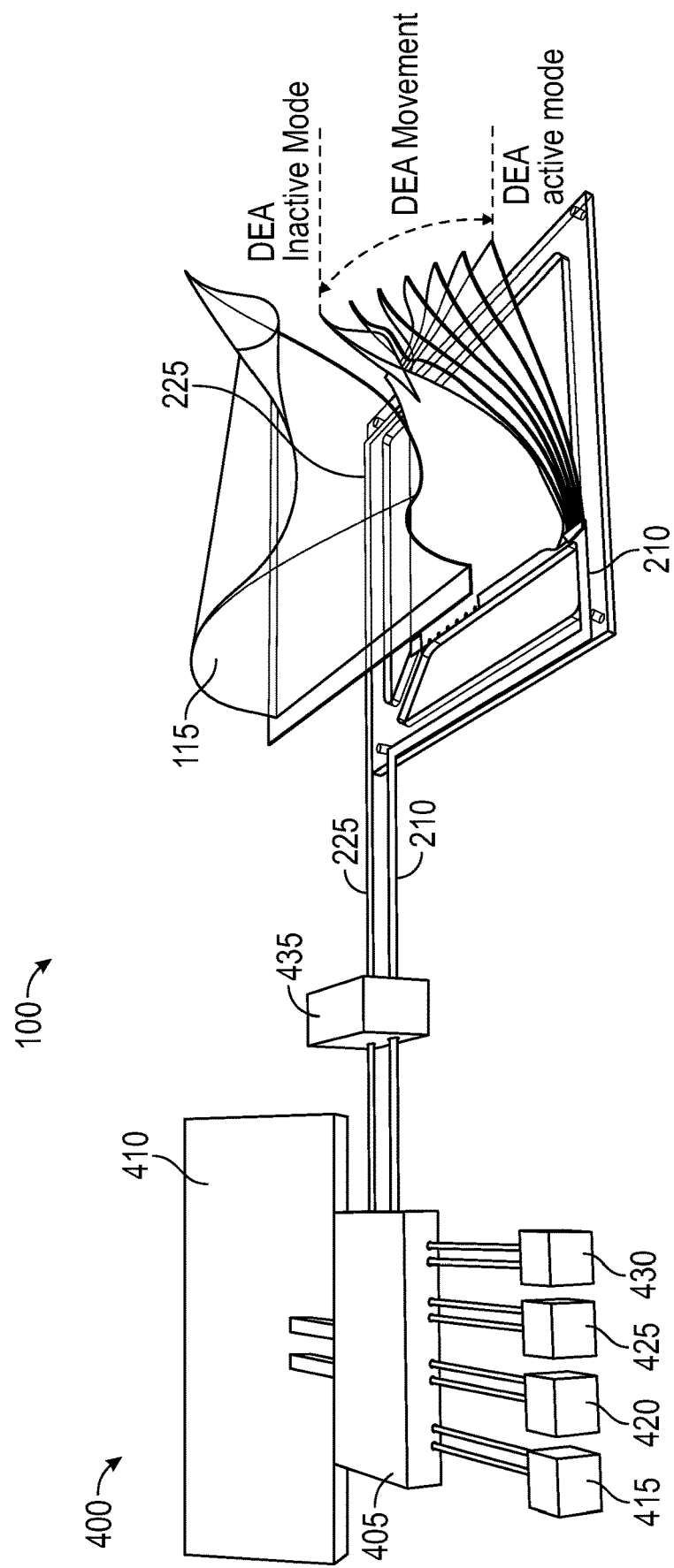
FIG. 4 depicts architecture of a control system connected to smart valve, in accordance with the disclosed embodiments.

Movement of the DEA Flap 120 is governed with a control system 400 as illustrated in FIG. 4. The control system 400 can generally include a microcontroller 405 which can be embodied as an Arduino®, or other such microcontroller. Power can be provided by a power supply 410. In certain embodiments the power supply can comprise a solar collector, but in other embodiments the power supply 410 can comprise a battery, a wall outlet (with an AC to DC converter) or other such DC power source.

A selection of sensors can be connected to the microcontroller 405. The sensors can be used to collect data that can be used to determine when the microcontroller 405 signals the DEA flap 120 to open or close. The sensors can include a temperature sensor 415, a humidity sensor 420, a light sensor 425, and/or a carbon dioxide sensor 430, among other possible sensors. In certain cases, the sensors can collect data from the environment on one side of the system 100 and that data can be used to adjust when the DEA system is moved from an open to closed state or vice versa (i.e. when the valve should be used to pump fluid into the environment).

The function of the microcontroller 405 and sensors is important, as it allows the user to set parameters that the microcontroller 405 can use to determine when to open and close the valve of system 100. In the simplest example, the sensors can be set to open the valve of system 100 when the temperature on one side of the system 100 exceeds a threshold temperature and to close the valve when the temperature measurement is below the threshold temperature. Similarly, the system can be set to open the valve of system when the humidity, light level, or carbon dioxide measurements exceed threshold levels.

In more complex examples, the system 100 can use a combination of input parameters compared to measurements provided by the sensors to determine if the system 100 should be opened or closed. In still other examples, the control system 400 can be configured to operate in more complex ways. For example, the sensor data from the sensors can be used to adjust a sequence of opening and closing the valve of system 100. The opening and closing can "pump" air from one side of the system 100 to the other. Timing for how long the valve is opened or closed, along with how quickly the system 100 is opened or closed can be configured according to the data provided by the sensors, so that the environment on the "inside" of the system 100 is held in the desired state.

The control system 400 can include power outputs to a BC booster 435 via connections 210 and 225 and then to the DEA Flap 120. A voltage difference can be applied via the connections 210 and 225, according to the input from the sensors and the microcontroller 405, the DEA Flap 120 will move from an open inactive state to a closed active state. When the voltage is turned off the DEA flap 120 will move from the close state to the open state. In this way, in certain embodiments, the system 100 comprises a fluidic valve for pumping a fluid from one environment to another.

Figure 5A:
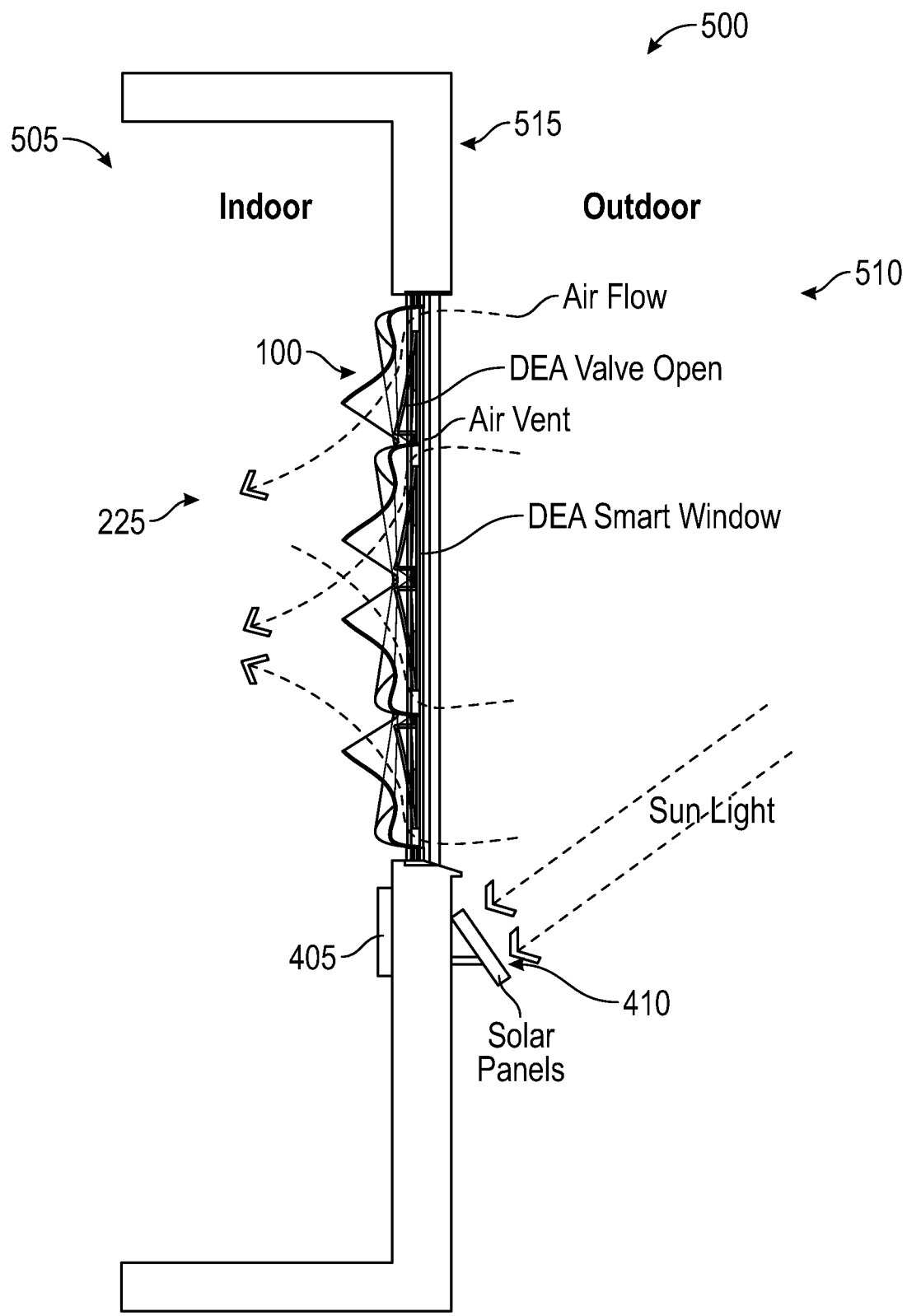
FIG. 5A depicts a smart valve embodied as a smart window, in accordance with the disclosed embodiments.
Figure 5B:
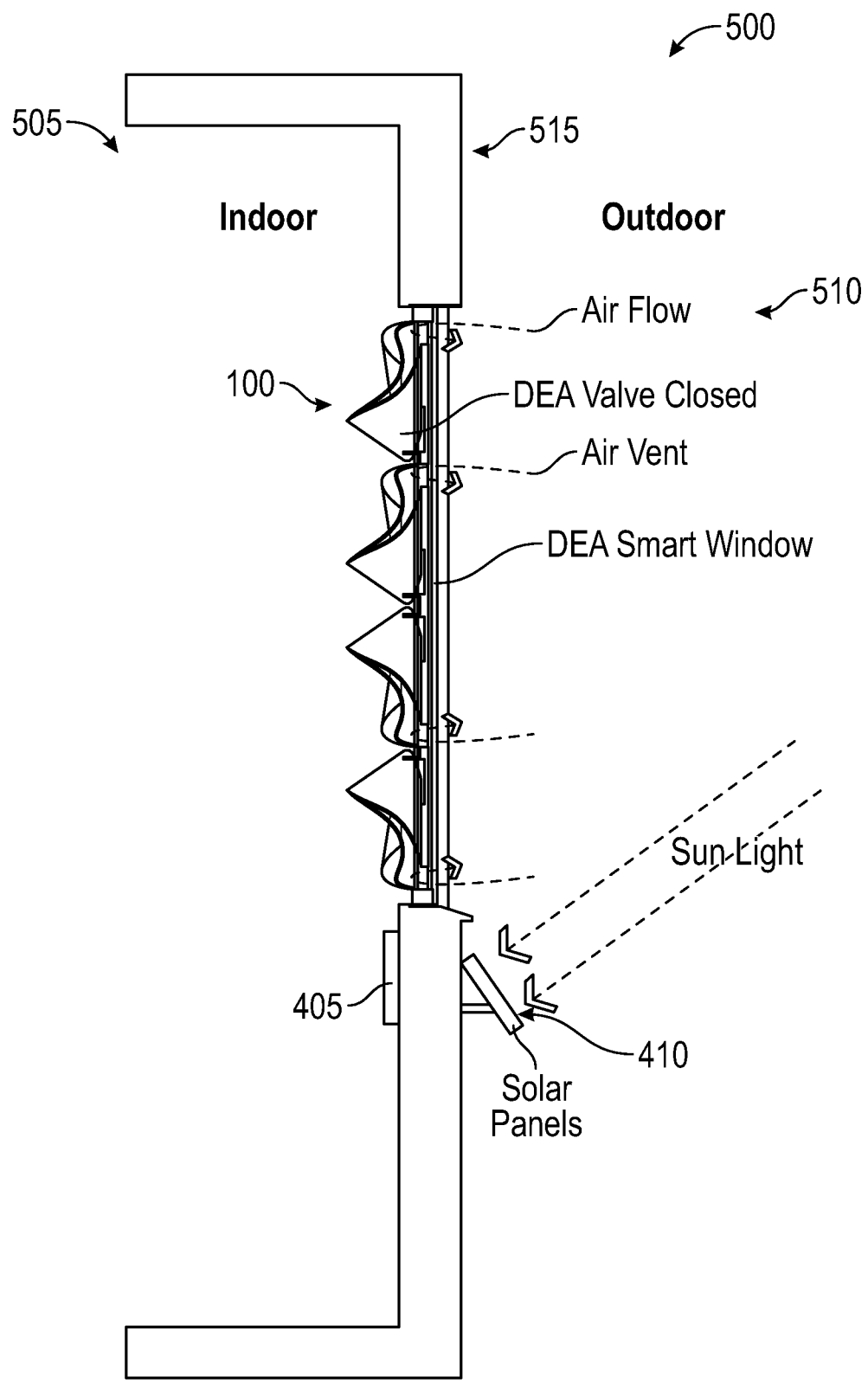
FIG. 5B depicts another view of a smart valve embodied as a smart window, in accordance with the disclosed embodiments.

In an exemplary embodiment, the system 100 can be configured as an active smart window 500 as illustrated in FIGS. 5A and 5B. For optimal human comfort, it is necessary to maintain a balanced indoor-outdoor symbiosis which can be achieved with the disclosed embodiments. The smart window 500, which can include one or more valve systems 100. Control systems 400, can track temperature change, humidity, light intensity, and carbon dioxide concentration in an interior and/or exterior environment. In most places, during some parts of the year, there are times during the day when outdoor air can be used to keep the indoor environment comfortable. During these times it is reasonable to shut down HVAC systems which can result in significant energy savings. Therefore, the disclosed embodiments are configured to maintain a comfortable indoor environment by pumping exterior air into the indoor environment, using the EAP-based, solar-powered, environmentally responsive smart window 500.

An exemplary smart window system 500, incorporating DAE flaps 120 is illustrated in FIGS. 5A and 5B. In FIG. 5A a profile view is provided of a system 500. In general, an indoor environment 505 is separated from an outdoor environment 510 by a wall 515. The smart window system 500 can be installed in the wall 515. The system 500 can generally comprise an array of EAP-based pumping valves as illustrated in FIG. 1, by system 100.

The system 500 can be powered by a power supply 410, which can comprise solar panels, and can include a control system 405. The control system 405 can include an interface that allows a user to set desired parameters associated with the indoor environment. Sensors 520 associated with the system 500 can be used to collect information about the indoor environment 505.

When the parameters so dictate, the DEA valves can open to allow airflow from the outdoor environment to enter the indoor environment. It should be noted that, even in cases where there is no wind in the outdoor environment, the pumping action created by the relatively high and low pressure zones created in the system, can create airflow into the indoor environment when the DEA flap is opened and closed.

FIG. 5B illustrates the system 500 with the DEA flaps 120 closed. In this state, air is prevented from entering the indoor environment from the outdoor environment by the seal between the shell 115 and the DEA flaps 120.

The EAP Smart window 500 disclosed herein can be run continuously using solar energy, such as four 3"×4" solar panels, or three AAA battery, or any other DC power supply, like a cell phone charger. A programmable micro controller with environmental sensors, can be used to operate the movement of the DEA flaps, fixed inside the smart window system 500. The careful design of the DEA valves and the gentle movement of DEA flaps together, create alternative low and high air pressure zones which causes the air to flow from one side to other. Thus, the Smart Window 500 maintains a regulated indoor-outdoor relationship and helps to remain in tune with outside natural conditions.

The DEA flaps 120 can be operated in constant, open, or closed mode. The window 500 is designed in such a way that it can be portable or can be fixed in a wall. In the case where the window 500 is portable, it can be installed in the open area of an existing window. Alternatively, in certain embodiments, the window 500 can be installed in the void in a wall to serve as a permanent window. The window 500 can include multiple pre-designed screens, so that the window can be run in an Active-Main or Inactive-Main mode depending on the season. The modular design of the window also allows for many different variations of size and shape depending on the application. An opaque version of the shell and base frame can be used to control indoor light intensity.

In the disclosed embodiments, a soft (EAP) material can be used for actuation, which is highly flexible, adaptable and can provide organic movement which allows shape metamorphosis and does not requires any additional framing systems to guide the forces. As such the Smart Window system 500 offers innumerable design options, variations in sizes and shapes, and is easy to manufacture. Moreover, EAP is very inexpensive, easy to make and requires very low energy to run.

Figure 6A:
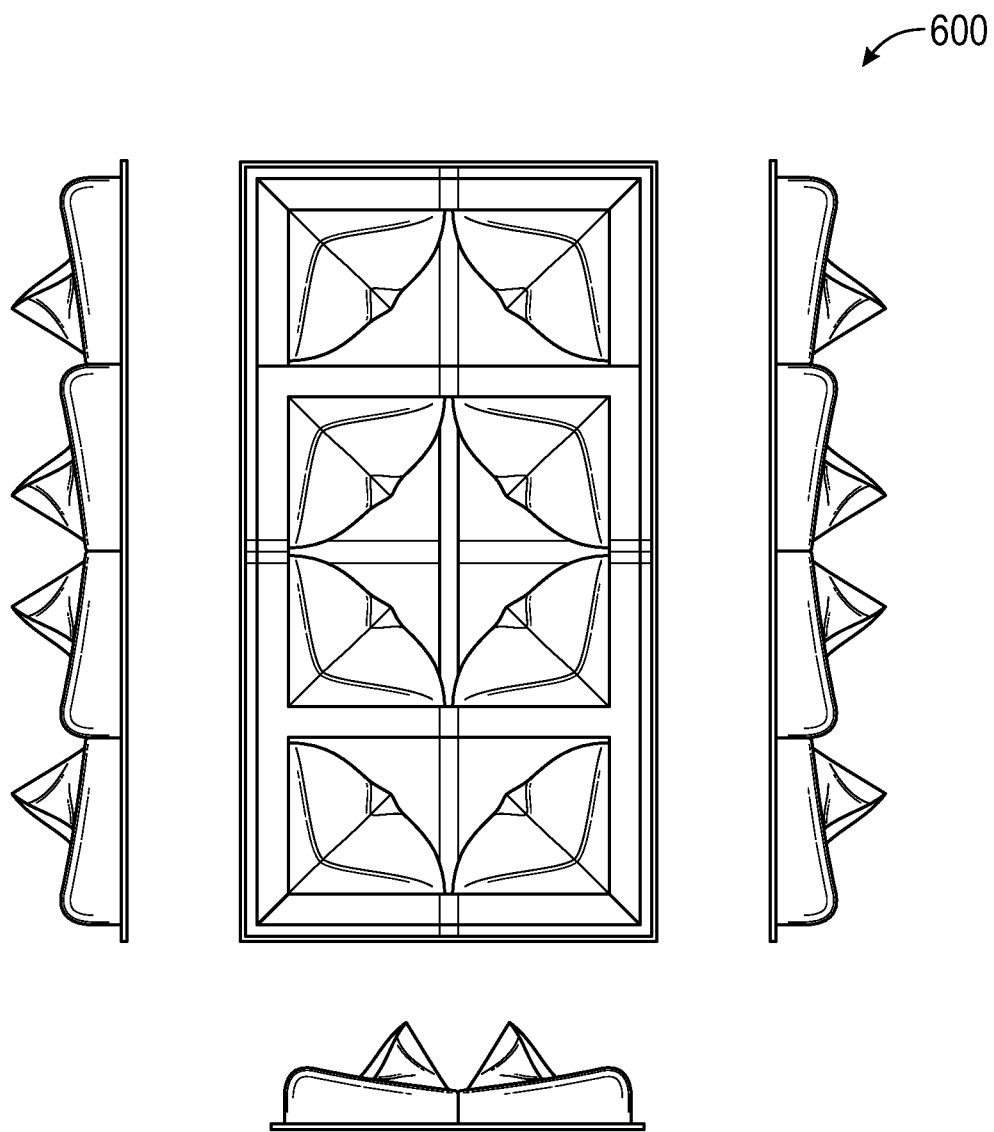
FIG. 6A depicts an array of smart valves forming a smart window, in accordance with the disclosed embodiments.
Figure 6B:
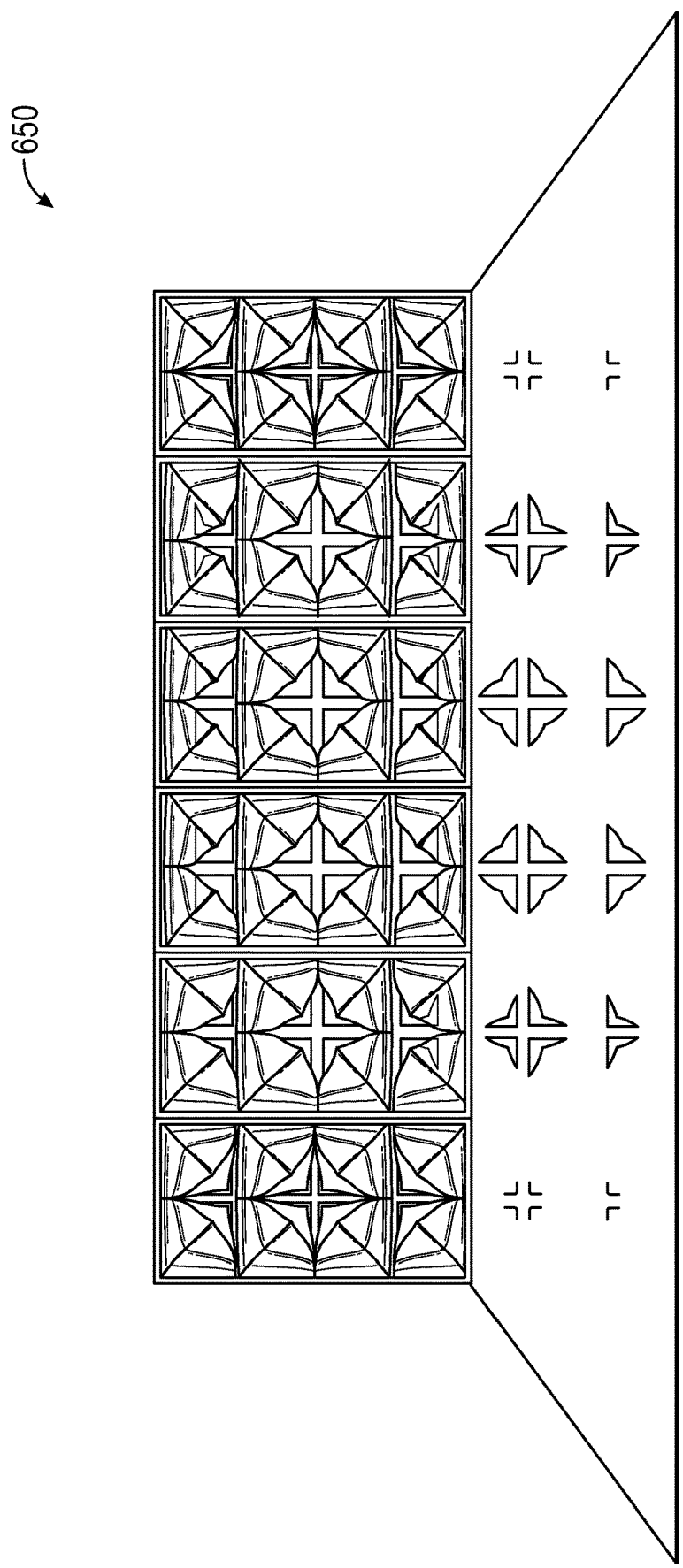
FIG. 6B depicts an array of smart valves formed in a wall, in accordance with the disclosed embodiments.

FIGS. 6A and 6B illustrate embodiments of a smart window system as described with respect to FIG. 5. FIG. 6A shows a front view, as well as profile views, of a smart window system 600. FIG. 6B illustrates an array of smart window systems 650 installed in a wall. It should be appreciated that the system can be used to create a pleasing aesthetic as well as function to maintain a comfortable homeostasis in an indoor environment by gently pumping outdoor air into the indoor environment.

Figure 7:
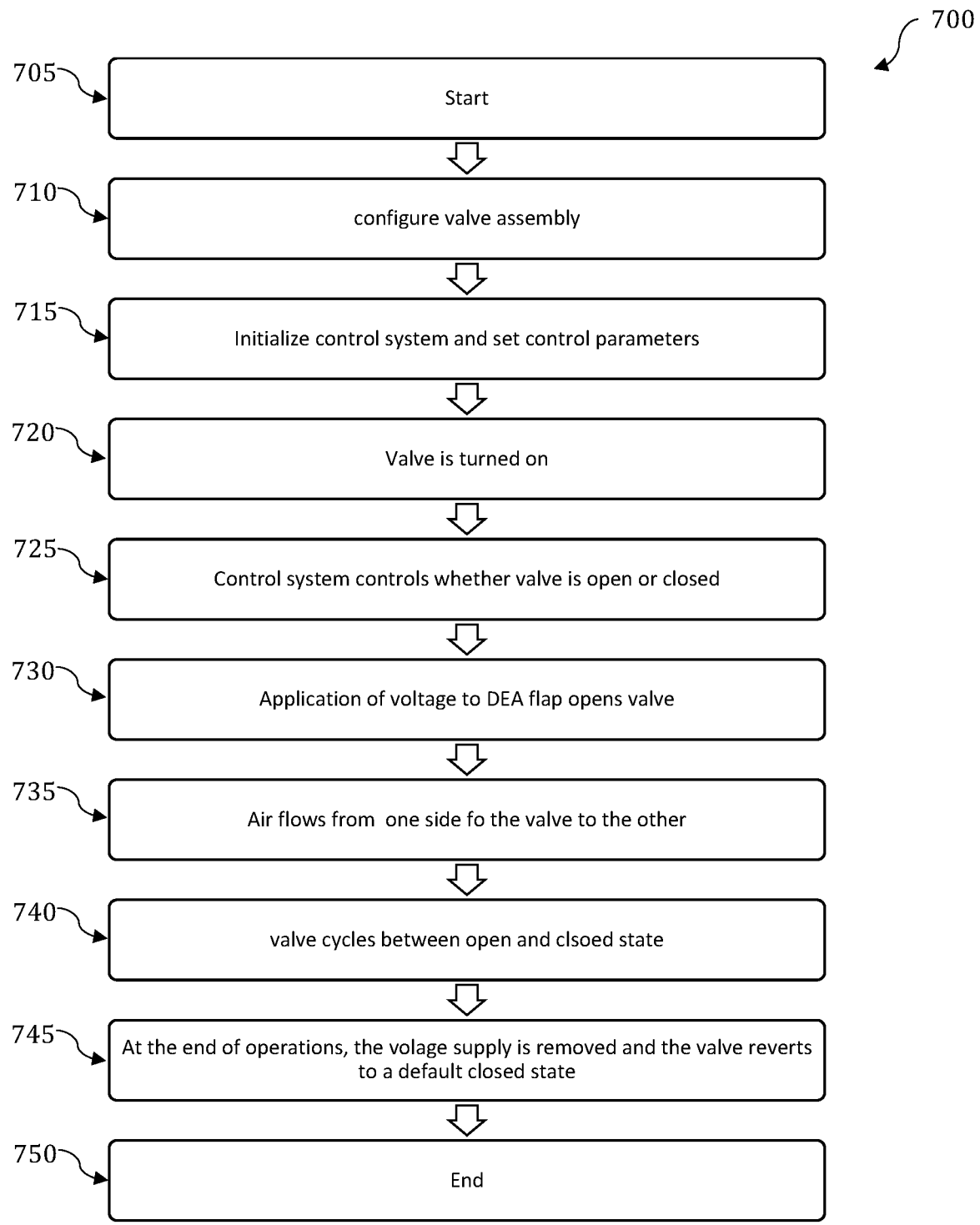
FIG. 7 depicts a method associated with a smart valve, in accordance with the disclosed embodiments.

FIG. 7 illustrates a flow chart of steps associated with a method 700 for pumping fluid from one environment to another using the systems disclosed herein. It should be appreciated that, in certain aspects, the method can be applied to a valve or smart valve as disclosed herein, or to a smart window as disclosed herein, to pump air from the outdoor environment to the indoor environment. The method begins at step 705.

At step 710, the valve can be configured. In certain embodiments, this can involve configuring a valve as illustrated in FIGS. 1 and 2 to include a housing with a shell mounted to the housing, and a (DEA) flap configured to form a seal with the shell. A power supply for supplying the voltage to the DEA flap can be embodied as a solar panel or a battery. A vent and a manifold can be formed in the shell in fluidic connection with the vent, such that fluid can flow into the manifold through the vent.

The system can further include a control system. The control system can comprise sensors and a microcontroller configured to control voltage provided to the DEA flap. The sensors can include a temperature sensor, a humidity sensor, a light sensor, and/or a carbon dioxide sensor. At step 715, the control system can be initialized and control parameters can be selected to allow a user to set desired environmental conditions on one side of the valve. For example, the user may set a desired temperature, humidity, and carbon dioxide level on one side of the valve. In other embodiments, the user may set tolerances or ranges of acceptable conditions on the side of the valve. In other embodiments, the user may select automatic or intermittent fluid pumping, regardless of such environmental conditions, or may select a manual mode where the user's input is required to change the state of the valve from open to closed.

With the initialization of the control system complete, at step 720, the smart valve can be turned on. At this point, the control system can be used to control whether the valve is in the open state or the closed state as illustrated at 725. In most cases the default position is the closed position. In the closed position voltage to the DEA flap is tuned off so the DEA flap is resting in its inactive, raised position, and forms a seal with the flap mold of the shell. When the valve needs to be opened, the control system can create a voltage difference via the connections to the DEA flap. The voltage difference will cause the DEA flap to transition from a closed inactive state to an open active state as shown at 730.

As the flap opens, the pressure differential created by the vent and manifold (as illustrated in FIG. 3) will cause fluid on the outside of the valve to pass through the valve to the opposing side of the valve as illustrated at 735.

As dictated by the control system, the valve can cycle between an open and closed state, as illustrated at 740. It should be appreciated that the cycle of opening and closing can be based on manual user input, a scheduled active cycle (e.g. valve changes state once every time period), or based on the measured parameters taken from the environmental sensors. At the end of operations, voltage can be removed from the DEA flaps so that they revert to their default closed state as shown at 745. The method then ends at 750.

It should be appreciated that this method is exemplary of how the smart valve can be used to pump fluid from one side of the valve to the other. In certain embodiments, this method can be realized as the pumping of air from the outside of a smart window to the inside of the smart window, in order to maintain a comfortable atmosphere inside a building. In other embodiments, other applications of the systems and methods can be implemented without departing from the scope of this disclosure.

Figure 8:
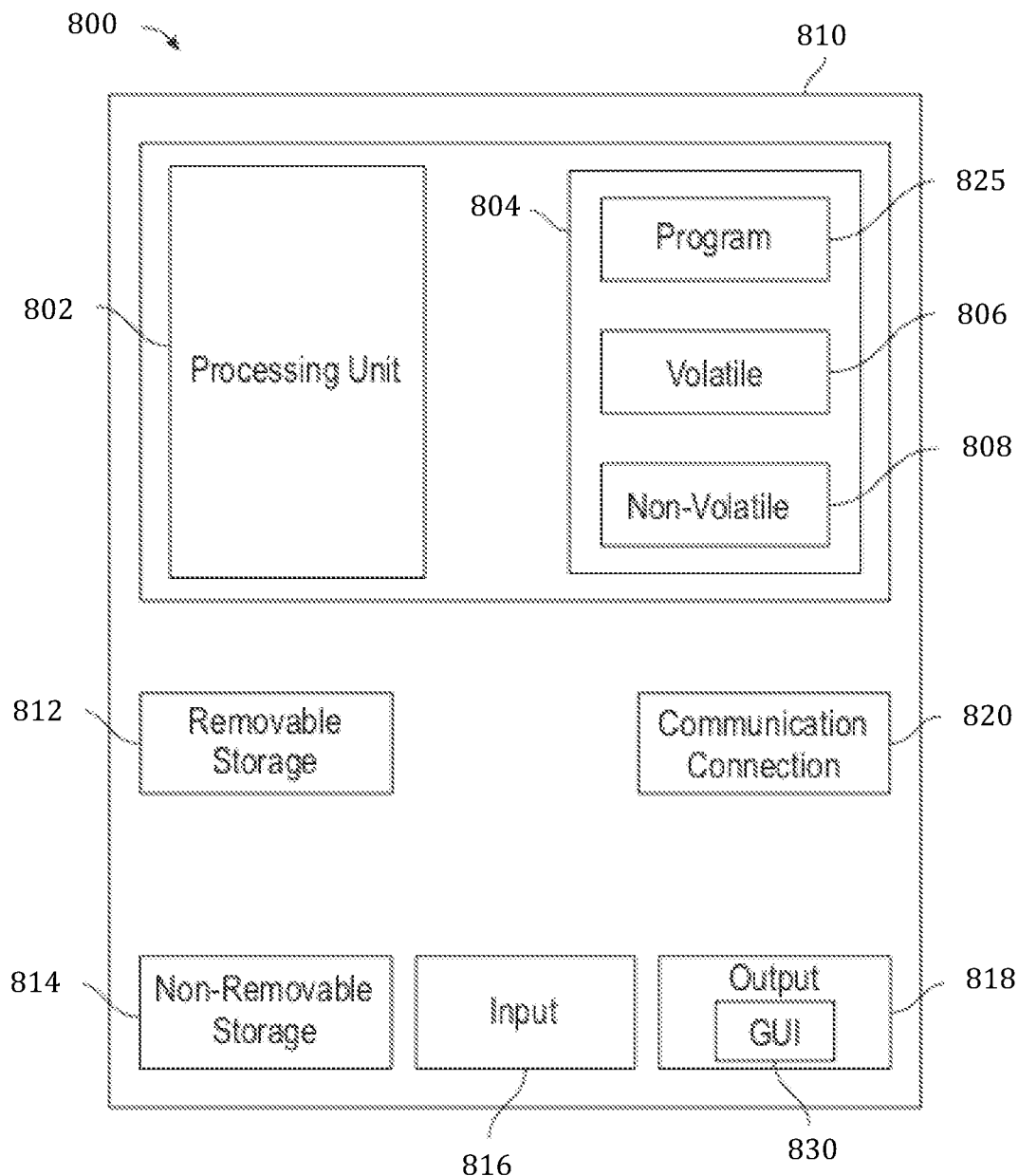
FIG. 8 depicts a block diagram of a computer system which is implemented in accordance with the disclosed embodiments.
Figure 9:
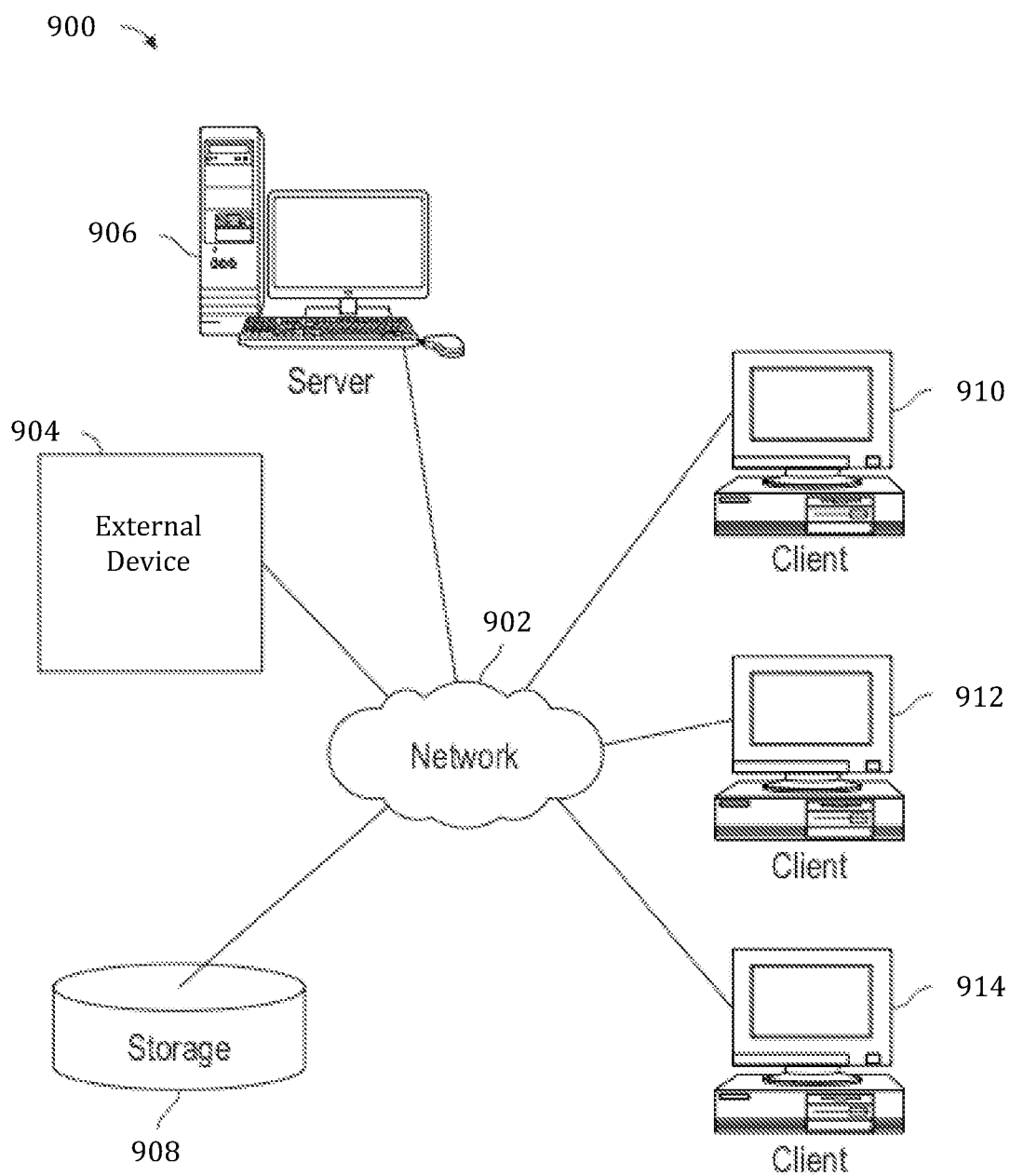
FIG. 9 depicts a graphical representation of a network of data-processing devices in which aspects of the present embodiments may be implemented.
Figure 10:
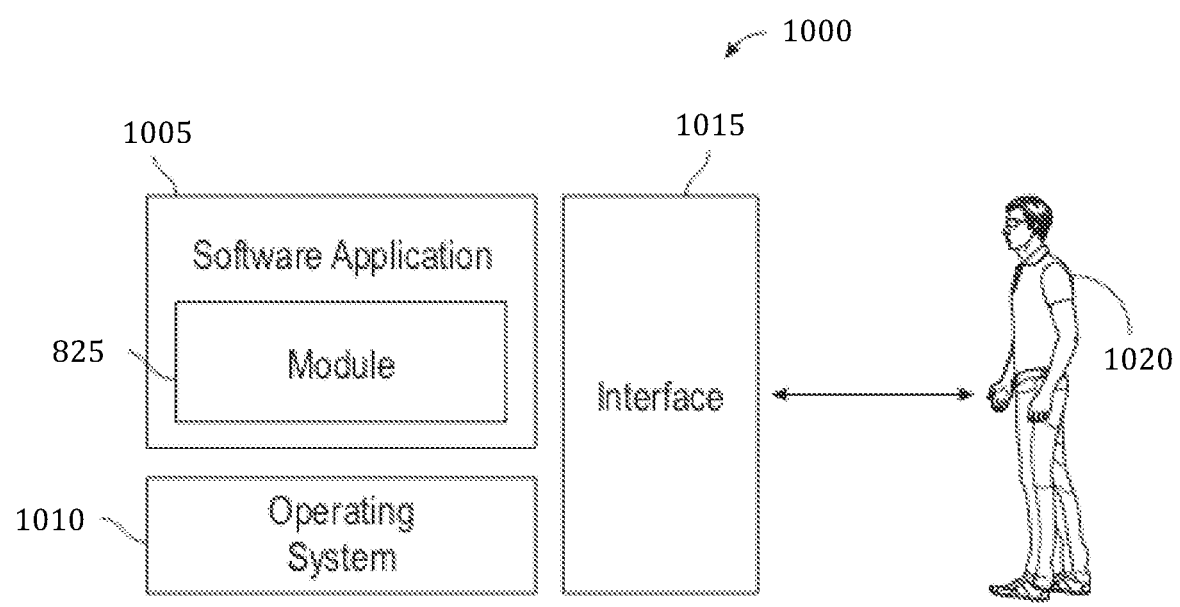
FIG. 10 depicts a computer software system for directing the operation of the data-processing system depicted in FIG. 8, in accordance with an embodiment.

Certain aspects of the embodiments disclosed herein require processing via computer systems. In particular, the control system can execute an algorithm to determine if the valve should be opened or closed and how long the valve should be opened or closed for, based on user parameters, input from environmental sensors, etc. FIGS. 8-10 are provided as exemplary diagrams of data-processing environments in which embodiments disclosed herein may be implemented. It should be appreciated that FIGS. 8-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 800 that executes programming for implementing parts of the methods and systems disclosed herein is shown in FIG. 8. A computing device in the form of a computer 810 configured to interface with sensors, peripheral devices, and other elements disclosed herein may include one or more processing units 802, memory 804, removable storage 812, and non-removable storage 814. Memory 804 may include volatile memory 806 and non-volatile memory 808. Computer 810 may include or have access to a computing environment that includes a variety of transitory and non-transitory computer-readable media such as volatile memory 806 and non-volatile memory 808, removable storage 812 and non-removable storage 814. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 810 may include or have access to a computing environment that includes input 816, output 818, and a communication connection 820. The computer may operate in a networked environment using a communication connection 820 to connect to one or more remote computers, remote sensors, detection devices, hand-held devices, multifunction devices (MFDs), mobile devices, tablet devices, mobile phones, Smartphones, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 9 below.

Output 818 is most commonly provided as a computer monitor, but may include any output device. Output 818 and/or input 816 may include a data collection apparatus associated with computer system 800. In addition, input 816, which commonly includes a computer keyboard and/or pointing device such as a computer mouse, computer track pad, or the like, allows a user to select and instruct computer system 800. A user interface can be provided using output 818 and input 816. Output 818 may function as a display for displaying data and information for a user, and for interactively displaying a graphical user interface (GUI) 830.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 816 such as, for example, a pointing device such as a mouse and/or with a keyboard. A particular item can function in the same manner to the user in all applications because the GUI provides standard software routines (e.g., module 825) to handle these elements and report the user's actions. The GUI can further be used to display the electronic service image frames as discussed below.

Computer-readable instructions, for example, program module or node 825, which can be representative of other modules or nodes described herein, are stored on a computer-readable medium and are executable by the processing unit 802 of computer 810. Program module or node 825 may include a computer application. A hard drive, CD-ROM, RAM, Flash Memory, and a USB drive are just some examples of articles including a computer-readable medium.

FIG. 9 depicts a graphical representation of a network of data-processing systems 900 in which aspects of the present embodiments may be implemented. Network data-processing system 900 is a network of computers or other such devices such as mobile phones, smartphones, sensors, detection devices, controllers and the like in which embodiments may be implemented. Note that the system 900 can be implemented in the context of a software module such as program module 825. The system 900 includes a network 902 in communication with one or more clients 910, 912, and 914. Network 902 may also be in communication with one or more device 904, servers 906, and storage 908. Network 902 is a medium that can be used to provide communications links between various devices and computers connected together within a networked data processing system such as computer system 800. Network 902 may include connections such as wired communication links, wireless communication links of various types, fiber optic cables, quantum, or quantum encryption, or quantum teleportation networks, etc. Network 902 can communicate with one or more servers 906, one or more external devices such as a controller, actuator, 3D printer, smart valve, smart valve control system or other such device 904, and a memory storage unit such as, for example, memory or database 908. It should be understood that device 904 may be embodied as a detector device, microcontroller, controller, receiver, transceiver, or other such device.

In the depicted example, external device 904, server 906, and clients 910, 912, and 914 connect to network 902 along with storage unit 908. Clients 910, 912, and 914 may be, for example, personal computers or network computers, handheld devices, mobile devices, tablet devices, smartphones, personal digital assistants, microcontrollers, recording devices, MFDs, etc. Computer system 800 depicted in FIG. 8 can be, for example, a client such as client 910 and/or 912.

Computer system 800 can also be implemented as a server such as server 906, depending upon design considerations. In the depicted example, server 906 provides data such as boot files, operating system images, applications, and application updates to clients 910, 912, and/or 914. Clients 910, 912, and 914 and external device 904 are clients to server 906 in this example. Network data-processing system 900 may include additional servers, clients, and other devices not shown. Specifically, clients may connect to any member of a network of servers, which provide equivalent content.

In the depicted example, network data-processing system 900 is the Internet with network 902 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 900 may also be implemented as a number of different types of networks such as, for example, an intranet, a local area network (LAN), or a wide area network (WAN). FIGS. 8 and 9 are intended as examples and not as architectural limitations for different embodiments disclosed herein.

FIG. 10 illustrates a software system 1000, which may be employed for directing the operation of the data-processing systems such as computer system 800 depicted in FIG. 8. Software application 1005, may be stored in memory 804, on removable storage 812, or on non-removable storage 814 shown in FIG. 8, and generally includes and/or is associated with a kernel or operating system 1010 and a shell or interface 1015. One or more application programs, such as module(s) or node(s) 825, may be "loaded" (i.e., transferred from removable storage 814 into the memory 804) for execution by the data-processing system 800. The data-processing system 800 can receive user commands and data through user interface 1015, which can include input 816 and output 818, accessible by a user 1020. These inputs may then be acted upon by the computer system 800 in accordance with instructions from operating system 1010 and/or software application 1005 and any software module(s) 825 thereof.

Generally, program modules (e.g., module 825) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smart phones, tablet devices, multi-processor systems, printers, 3D printers, copiers, fax machines, multi-function devices, data networks, microprocessor-based or programmable consumer electronics, networked personal computers, minicomputers, mainframe computers, servers, medical equipment, medical devices, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 1015 (e.g., a graphical user interface 830) can serve to display results, whereupon a user 1020 may supply additional inputs or terminate a particular session. In some embodiments, operating system 1010 and GUI 830 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 1010 and interface 1015. The software application 1005 can include, for example, module(s) 825, which can include instructions for carrying out steps or logical operations such as those shown and described herein.

This description is presented with respect to embodiments of the present invention, which can be embodied in the context of, or require the use of a data-processing system such as computer system 800, in conjunction with program module 825, and data-processing system 900 and network 902 depicted in FIGS. 8-10. The present embodiments, however, are not limited to any particular application or any particular environment. Instead, those skilled in the art will find that the systems and methods of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation. In other embodiments, manual control of various aspects may be achievable while closely monitoring readbacks.

The disclosed embodiments can thus be employed to maintain an automatic indoor-outdoor relationship through ventilation, where the smart window system can maintain a regulated indoor-outdoor relationship automatically. The smart window system is net zero energy and sensitive to environmental stimuli, and because the Smart Window is electro active, its behavior is programmable. Furthermore, the raw materials are very inexpensive, widely available, and modular such that parts are easily reproducible and replaceable.

The shape of the deign can be adaptable, flexible and allows significant tolerance. The system can be portable and can be placed inside a typical window or can be fixed to a wall.

The gentle movement of the DEA flaps pumps the air in/out silently and is thus totally noise free. The system is further designed to be aesthetically pleasing and dynamic to response. For example, in embodiments that use a polymer base, it can be configured with many different colors, transparencies and thicknesses.

Based on the foregoing, it can be appreciated that a number of embodiments, preferred and alternative, are disclosed herein. For example, in certain embodiments a system comprises a housing, at least one shell mounted to the housing, and at least one Dielectric Elastomer Actuator flap forming a seal with the at least one shell, wherein applying a voltage to the Dielectric Elastomer Actuator flap causes the Dielectric Elastomer Actuator flap to open the seal with the at least one shell.

In an embodiment, the system comprises a power supply for supplying the voltage to the Dielectric Elastomer Actuator flap. In an embodiment, the power supply comprises at least one of a solar panel and/or a battery.

In an embodiment, the system comprises a control system comprising at least one sensor and a microcontroller, wherein the control system is configured to control the voltage provided to the Dielectric Elastomer Actuator flap. In an embodiment, the at least one sensor further comprises at least one of: a temperature sensor, a humidity sensor, a light sensor, and/or a carbon dioxide sensor.

In an embodiment, the system comprises a vent, and a manifold formed in the at least one shell in fluidic connection with the vent, wherein fluid can flow into the manifold through the vent. In an embodiment, the at least one shell comprises an array of shells and the at least one Dielectric Elastomer Actuator flap comprises an array of Dielectric Elastomer Actuator flaps. In an embodiment, the housing is configured to be mounted as a window.

In an embodiment, a smart window system comprises a housing configured to fit in an opening for a window, at least one shell mounted to the housing, a vent, a manifold formed in the at least one shell in fluidic connection with the vent, wherein fluid can flow into the manifold through the vent, at least one Dielectric Elastomer Actuator flap forming a seal with the at least one shell, a power supply supplying a voltage to the Dielectric Elastomer Actuator flap, and a control system comprising at least one sensor and a microcontroller, wherein the control system is configured to control the voltage provided to the Dielectric Elastomer Actuator flap, wherein turning the power supply on causes the Dielectric Elastomer Actuator flap to open the seal with the at least one shell and turning the power supply off causes the Dielectric Elastomer Actuator flap to close and seal with the at least one shell.

In an embodiment of the smart window system, the power supply comprises at least one of a solar panel and a battery.

In an embodiment, the at least one sensor further comprises at least one of: a temperature sensor, a humidity sensor, a light sensor, and/or a carbon dioxide sensor.

In an embodiment, the at least one shell comprises an array of shells and the at least one Dielectric Elastomer Actuator flap comprises an array of Dielectric Elastomer Actuator flaps.

In an embodiment, the smart window system comprises a weather coating formed on the Dielectric Elastomer Actuator flap and/or a thermal coating formed on the Dielectric Elastomer Actuator flap.

In an embodiment, a fluidic valve system comprises a housing, a shell mounted to the housing, a vent for allowing fluid to enter the housing in a high pressure zone, and at least one Dielectric Elastomer Actuator flap forming a seal with the shell, wherein applying a voltage to the Dielectric Elastomer Actuator flap causes the Dielectric Elastomer Actuator flap to open the seal with the shell so that fluid can exit through a low pressure zone created between the shell and the Dielectric Elastomer Actuator flap.

In an embodiment, the fluidic valve system comprises a power supply for supplying the voltage to the Dielectric Elastomer Actuator flap. In an embodiment, the power supply comprises at least one of a solar panel and/or a battery.

In an embodiment, the fluidic valve system further comprises a control system comprising a microcontroller, wherein the control system is configured to control the voltage provided to the Dielectric Elastomer Actuator flap.

In an embodiment of the fluidic valve system the Dielectric Elastomer Actuator flap comprises a polymer film, a first conductive carbon coating applied to the top of the polymer film, a second conductive carbon coating applied to the bottom of the polymer film, and a frame. In an embodiment, the fluidic valve system comprises a weather coating formed on the Dielectric Elastomer Actuator flap and/or a thermal coating formed on the Dielectric Elastomer Actuator flap.

In an embodiment, the fluidic valve system further comprises a manifold formed in the shell in fluidic connection with the vent, wherein fluid can flow into the manifold through the vent.

It should be appreciated that variations of the above-disclosed and other features and functions, or alternatives thereof, may be desirably combined into many other different systems or applications. It should be understood that various presently unforeseen or unanticipated alternatives, modifications, variations or improvements therein may be subsequently made by those skilled in the art which are also intended to be encompassed by the following claims.

What is claimed is:

1. A system comprising:
   a housing;
   at least one shell mounted to the housing, the at least one shell comprising a flap mold; and
   at least one Dielectric Elastomer Actuator flap, the at least one Dielectric Elastomer Actuator flap being bound on at least two sides in the housing, and a corner of the Dielectric Elastomer Actuator flap being unbound to the housing, wherein the corner of the Dielectric Elastomer Actuator flap is configured to form a seal with the flap mold of the at least one shell, wherein applying a voltage to the Dielectric Elastomer Actuator flap causes the Dielectric Elastomer Actuator flap to open the seal with the at least one shell.

2. The system of claim 1 further comprising:
   a power supply for supplying the voltage to the Dielectric Elastomer Actuator flap.

3. The system of claim 2 wherein the power supply comprises at least one of:
   a solar panel; and/or
   a battery.

4. The system of claim 1 further comprising:
   a control system comprising at least one sensor and a microcontroller, wherein the control system is configured to control the voltage provided to the Dielectric Elastomer Actuator flap.

5. The system of claim 4 wherein the at least one sensor further comprises at least one of:
   a temperature sensor;
   a humidity sensor;
   a light sensor; and/or
   a carbon dioxide sensor.

6. The system of claim 1 further comprising:
   a vent; and
   a manifold formed in the at least one shell in fluidic connection with the vent, wherein fluid can flow into the manifold through the vent.

7. The system in claim 1 wherein the at least one shell comprises an array of shells and the at least one Dielectric Elastomer Actuator flap comprises an array of Dielectric Elastomer Actuator flaps.

8. The system in claim 1 wherein the housing is configured to be mounted as a window.

9. A smart window system comprising:
   a housing configured to fit in an opening for a window;
   at least one shell mounted to the housing, the at least one shell comprising a flap mold;
   a vent;
   a manifold formed in the at least one shell in fluidic connection with the vent, wherein fluid can flow into the manifold through the vent;
   at least one Dielectric Elastomer Actuator flap forming a seal with the at least one shell;
   a power supply supplying a voltage to the Dielectric Elastomer Actuator flap; and
   a control system comprising at least one sensor and a microcontroller, wherein the control system is configured to control the voltage provided to the Dielectric Elastomer Actuator flap, wherein turning the power supply on causes the Dielectric Elastomer Actuator flap to open the seal with the at least one shell and turning the power supply off causes the Dielectric Elastomer Actuator flap to close and seal with the at least one shell.

10. The smart window system of claim 9 wherein the power supply comprises at least one of:
a solar panel; and
a battery.

11. The smart window system of claim 9 wherein the at least one sensor further comprises at least one of:
a temperature sensor;
a humidity sensor;
a light sensor; and/or
a carbon dioxide sensor.

12. The smart window system of claim 9 wherein the at least one shell comprises an array of shells and the at least one Dielectric Elastomer Actuator flap comprises an array of Dielectric Elastomer Actuator flaps.

13. The smart window system of claim 9 further comprising at least one of:
a weather coating formed on the Dielectric Elastomer Actuator flap; and/or
a thermal coating formed on the Dielectric Elastomer Actuator flap.

14. A fluidic valve system comprising:
a housing;
a shell mounted to the housing, the at least one shell comprising a flap mold;
a vent for allowing fluid to enter the housing in a high pressure zone; and
at least one Dielectric Elastomer Actuator flap forming a seal with the flap mold of the shell, wherein applying a voltage to the Dielectric Elastomer Actuator flap causes the Dielectric Elastomer Actuator flap to open the seal with the shell so that fluid can exit through a low pressure zone created between the shell and the Dielectric Elastomer Actuator flap.

15. The fluidic valve system of claim 14 further comprising:
a power supply for supplying the voltage to the Dielectric Elastomer Actuator flap.

16. The fluidic valve system of claim 15 wherein the power supply comprises at least one of:
a solar panel; and/or
a battery.

17. The fluidic valve system of claim 14 further comprising:
a control system comprising a microcontroller, wherein the control system is configured to control the voltage provided to the Dielectric Elastomer Actuator flap.

18. The fluidic valve system of claim 14 wherein the Dielectric Elastomer Actuator flap comprises:
a polymer film;
a first conductive carbon coating applied to the top of the polymer film;
a second conductive carbon coating applied to the bottom of the polymer film; and
a frame.

19. The fluidic valve system of claim 18 further comprising at least one of:
a weather coating formed on the Dielectric Elastomer Actuator flap; and/or
a thermal coating formed on the Dielectric Elastomer Actuator flap.

20. The fluidic valve system of claim 14 further comprising:
a manifold formed in the shell in fluidic connection with the vent, wherein fluid can flow into the manifold through the vent.

* * * * *